United States Patent
Okereke et al.

(10) Patent No.: US 9,336,389 B1
(45) Date of Patent: May 10, 2016

(54) RAPID MALWARE INSPECTION OF MOBILE APPLICATIONS

(71) Applicant: Amazon Technologies, Inc., Reno, NV (US)

(72) Inventors: Mekka Chibuisi Okereke, Irvine, CA (US); Peter Phan Han, Chino Hills, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 13/970,322

(22) Filed: Aug. 19, 2013

(51) Int. Cl.
*H04L 29/06* (2006.01)
*G06F 21/56* (2013.01)

(52) U.S. Cl.
CPC .......... *G06F 21/56* (2013.01); *H04L 63/1441* (2013.01)

(58) Field of Classification Search
CPC ..... G06F 21/56; G06F 21/563; G06F 21/564; G06F 21/565
USPC ............................... 726/23, 24; 713/187, 188
See application file for complete search history.

(56) References Cited

U.S. PATENT DOCUMENTS

| | | | | |
|---|---|---|---|---|
| 2007/0240217 | A1* | 10/2007 | Tuvell | G06F 21/56 726/24 |
| 2009/0300761 | A1* | 12/2009 | Park | G06F 21/562 726/23 |
| 2010/0281540 | A1* | 11/2010 | Alme | G06F 21/563 726/23 |
| 2011/0167260 | A1* | 7/2011 | Fanton et al. | 713/165 |
| 2011/0185417 | A1* | 7/2011 | Zhou | G06F 21/566 726/22 |
| 2013/0160126 | A1* | 6/2013 | Kapoor et al. | 726/24 |

\* cited by examiner

*Primary Examiner* — Dao Ho
(74) *Attorney, Agent, or Firm* — Thomas | Horstemeyer, LLP (57) ABSTRACT

Disclosed are various embodiments for inspecting malware with little or no user interruption. A first computing device may compare a source code of an application to a fingerprint stored locally on the first computing device. The first computing device may transmit the source code to a second computing device to determine whether the source code resides in a database comprising approved applications. If the source code does not reside in the database, a thorough scan of the source code may be conducted.

20 Claims, 9 Drawing Sheets

RAPID MALWARE INSPECTION OF MOBILE APPLICATIONS

BACKGROUND

Traditional malware and/or virus detection is an intensive process that comprises comparing files and/or portions of files to vast malware and/or virus databases. Although the intensive malware and/or virus detection may be conducted on a desktop computer, mobile devices may not have the computing power and/or the memory to conduct such an intensive task. Yet, the number of mobile applications comprising malware continues to grow.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Malicious computing instructions, also known as "malware," are disruptive computer instructions that may cause damage to one or more computing devices and/or may obtain private information from the one or more computing devices. For example, malware may comprise computer viruses, Trojan horses, rootkits, key loggers, spyware, adware, and/or other malicious applications. Traditional malware and/or virus detection is an intensive process that comprises comparing files and/or portions of files to vast malware and/or virus databases. For example, each file of a computer may be "scanned" by comparing the file and/or portions of the file to known malware identities in one or more databases. By having to access each file on the computer, the process of detecting malware and/or a virus is intensive and expensive, requiring a substantial amount of computing time on a processor. Although the intensive malware and/or virus detection may be conducted on a desktop computer, mobile devices may not have the computing power and/or the memory to conduct such an intensive task. Yet, the number of mobile applications comprising malware continues to grow.

Electronic commerce systems facilitate the purchase and/or download of applications and/or digital content on devices. For example, a user of a mobile device may access an electronic commerce system to purchase and/or download applications or digital content capable of being executed or rendered on the user's mobile device. Accordingly, it is beneficial to conduct a deep and thorough scan of an application and/or digital content as it is placed on the electronic commerce system. According to a result of the scan, it may be determined whether the application is approved or denied for installation and/or execution on one or more devices. Assuming an application and/or digital content was loaded on a device in a manner other than downloading the application and/or digital content from an electronic commerce system, a client verification application may be executed to determine whether to permit or deny installation and/or execution of the application on the device.

In the following discussion, a general description of the system and its components is provided, followed by a discussion of the operation of the same.

Figure 1A:
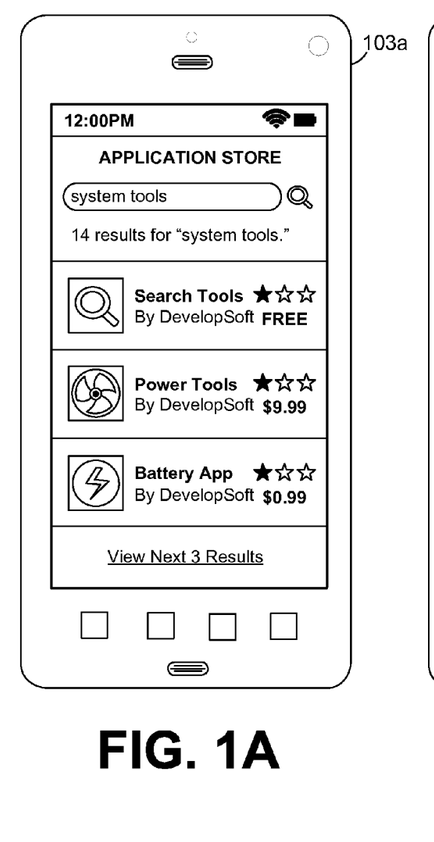
FIGS. 1A-B are drawings of client devices rendering client applications on a display according to various embodiments of the present disclosure.
Figure 1B:
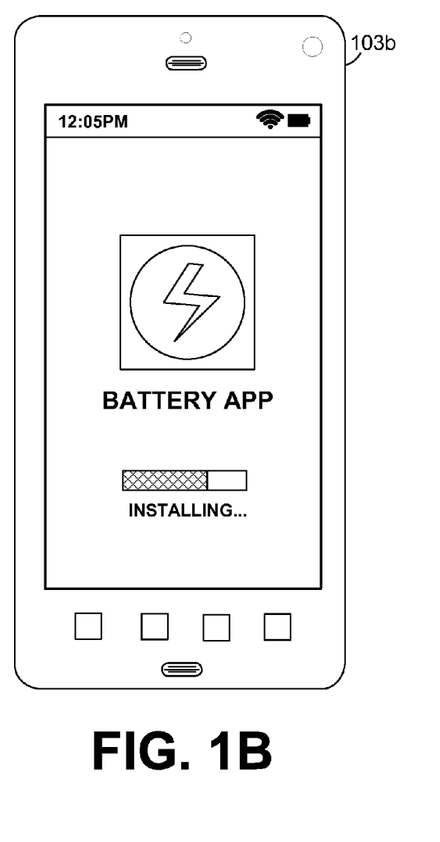

With reference to FIGS. 1A-B, shown are drawings of mobile devices 103a and 103b (e.g., "smartphones") configured to render client applications on a display according to various embodiments of the present disclosure. In the non-limiting example of FIG. 1A, an electronic commerce system (referred to as an "application store") may be rendered in the display of a mobile device 103a to facilitate the purchase and/or download of one or more applications that are capable of being executed on the mobile device. Similarly, the electronic commerce system may offer one or more digital content items (e.g., audio files, video files, electronic books, etc.) for purchase and/or download.

As may be appreciated, an installation of an application purchased and/or downloaded from the electronic commerce system may be initiated, as shown in FIG. 1B. Before (or during) installation and/or execution of an application, the application may be checked for malware by one or more malware detection services, as will be discussed in greater detail below.

Next, a discussion of a computing environment is provided in which a malware detection service is implemented followed by a discussion of the operation of the same.

Figure 2:
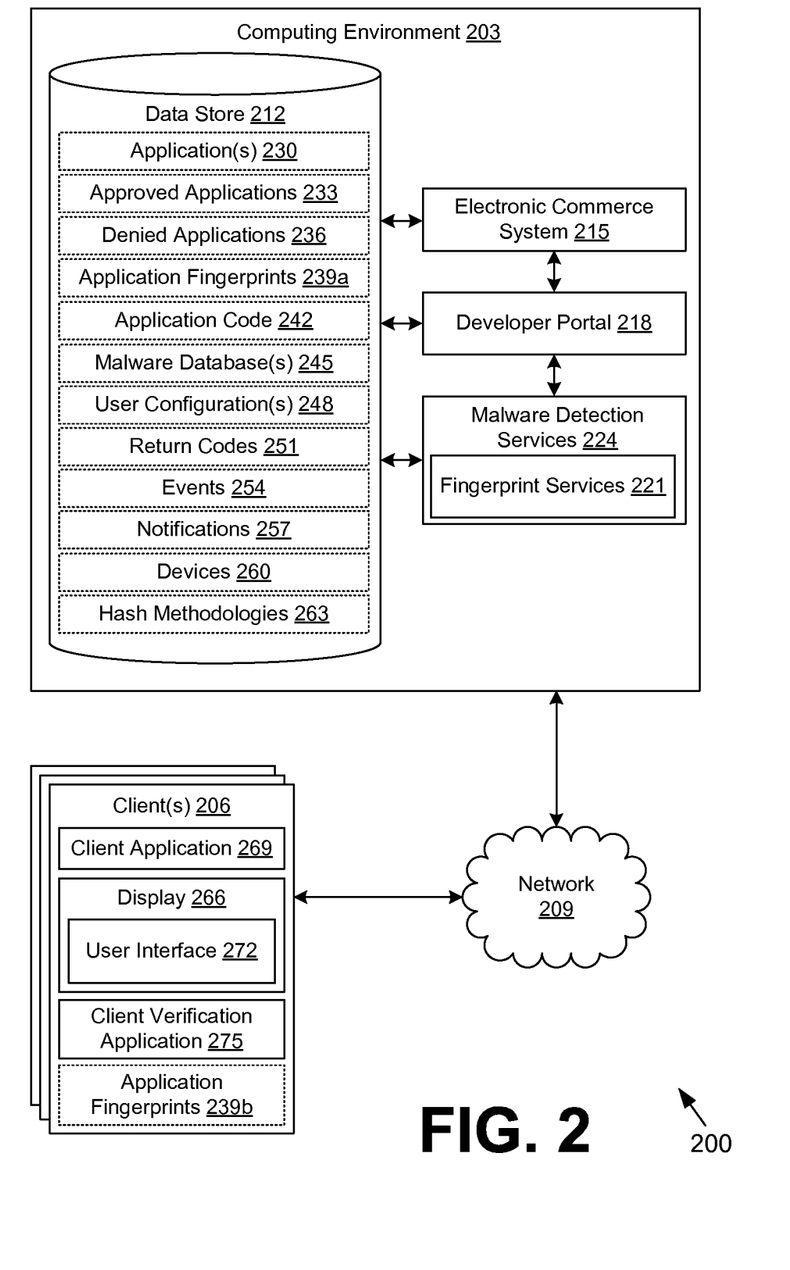
FIG. 2 is a drawing of a networked environment according to various embodiments of the present disclosure.

With reference to FIG. 2, shown is a networked environment 200 according to various embodiments. The networked environment 200 includes a computing environment 203 and a client device 206, which are in data communication with each other via a network 209. The network 209 includes, for example, the Internet, intranets, extranets, wide area networks (WANs), local area networks (LANs), wired networks, wireless networks, or other suitable networks, etc., or any combination of two or more such networks.

The computing environment 203 may comprise, for example, a server computer or any other system providing computing capability. Alternatively, the computing environment 203 may employ a plurality of computing devices that may be employed that are arranged, for example, in one or more server banks or computer banks or other arrangements. Such computing devices may be located in a single installation or may be distributed among many different geographical locations. For example, the computing environment 203 may include a plurality of computing devices that together may comprise a cloud computing resource, a grid computing resource, and/or any other distributed computing arrangement. In some cases, the computing environment 203 may correspond to an elastic computing resource where the allotted capacity of processing, network, storage, or other computing-related resources may vary over time.

Various applications and/or other functionality may be executed in the computing environment 203 according to various embodiments. Also, various data is stored in a data store 212 that is accessible to the computing environment 203. The data store 212 may be representative of a plurality of data stores 212 as can be appreciated. The data stored in the data store 212, for example, is associated with the operation of the various applications and/or functional entities described below. The components executed on the computing environment 203, for example, include an electronic commerce system 215, a developer portal 218, fingerprint services 221, malware detection services 224, and other applications, services, processes, systems, engines, or functionality not discussed in detail herein. These components may be implemented as one or more web services capable of communication via one or more programmatic service calls (e.g., Application Programming Interface (API) calls).

The electronic commerce system 215 is executed in order to facilitate the online purchase of applications and/or digital content over the network 209. The electronic commerce system 215 also performs various backend functions associated with the online presence of a merchant in order to facilitate the online purchase of applications and/or digital content as will be described. For example, the electronic commerce system 215 generates network pages such as web pages or other types of network content that are provided to client devices 206 for the purposes of selecting applications and/or digital content for purchase, rental, download, lease, or other form of consumption as will be described.

The developer portal 218 is executed to receive one or more applications provided by users and/or developers during an ingestion process. An ingestion process may comprise, for example, a series of user interfaces that may be presented to a user to facilitate an upload of an application associated with the user to a data store 212.

The fingerprint services 221 are executed to generate one or more unique identifiers (i.e., "fingerprints") of one or more applications. For example, the fingerprint services 221 may take data of any size and map the data to a much shorter bit string that has a high probability of being unique to the original data. Mapping may comprise, for example, applying one or more hash methodologies to accomplish generating a unique fingerprint. Alternatively, mapping may comprise generating unique fingerprints using other known fingerprinting methodologies, as may be appreciated.

The malware detection services 224 are executed to determine whether one or more applications should be installed and/or executed on one or more devices. The malware detection services 224 may thoroughly compare application code, portions of application code, and/or other data items to records in one or more malware databases in the computing environment 203 (as opposed to doing so on a client device 206). The presence of an identical portion of application code in the one or more malware databases may indicate that an application comprises a virus and/or malware. Similarly, the malware detection services 224 may determine whether an application is capable of future modification. For example, the malware detection services 224 may identify the presence of scripts that may modify the application without a user of the device's knowledge. A thorough inspection of an application and/or a digital content item may be conducted at a time of ingestion of the application and/or may be conducted dynamically in the event an application has not been inspected.

The data stored in the data store 212 includes, for example, applications 230, approved applications 233, denied applications 236, application fingerprints 239a, application code 242, malware databases 245, user configurations 248, return codes 251, events 254, notifications 257, devices 260, hash methodologies 263, and potentially other data. Applications 230 may comprise, for example, data that cause a computer to perform an instructed task. For example, applications 230 may comprise one or more mobile applications available for purchase on the electronic commerce system 215.

Approved applications 233 may comprise, for example, applications 230 that have been thoroughly inspected by the malware detection services 224 with no identifiable malware, viruses, or suspect attributes being detected. Conversely, denied applications 236 may comprise, for example, applications 230 that have been thoroughly inspected by the malware detection services 224 with identifiable malware, viruses, or suspect attributes being detected.

Application fingerprints 239a may comprise, for example, identifiers of an application 230 that are unique to the application 230. For example, the fingerprint services 221 may take data of any size and map the data to a much shorter bit string that has a high probability of being unique to the original data. Mapping may comprise, for example, applying one or more hash methodologies 263 to accomplish generating a unique fingerprint.

Application code 242 may comprise, for example, a portion of an application 230 comprising computer instructions written in one or more computer languages that instructs a computing device to perform the computer instructions. The one or more computer languages may comprise, for example, a human-readable computer language. For example, an application 230 may be developed in a human readable computer language such as JAVA™. The application 230 may be packaged wherein the human readable computer language is compiled into executable code and/or any other intermediate format. Accordingly, application code 242 obtained from an application file (e.g., APK file) may comprise source code (e.g., JavaScript, HTML, etc.), byte code, executable code, intermediate format code, and/or any other code comprising machine instructions in one or more formats or computer languages. Application code 242 may be accessed by "unpacking" the code from a packaged application file as will be discussed in greater detail below.

Malware database(s) 245 may comprise, for example, records of identifiable characteristics of known malware that may be used in inspecting data for the presence of the known malware. As discussed above, malware databases 245 may comprise information and/or records associated with one or more computer viruses, Trojan horses, rootkits, key loggers, spyware, adware, and/or other malicious computer instructions. The application code 242 or portions thereof may be compared to the records for identifiable characteristics, patterns, and/or portions of code that may indicate the presence of malware. For example, blocks of the application code 242 may be compared to blocks of known malware code in signature-based malware detection. In another example, patterns of the application code 242 and/or sequences of code in the application code 242 may be compared to known patterns or sequences of code of malicious applications (e.g., viruses, Trojan horses, key loggers, etc.). As may be appreciated, the malware databases 245 may be constantly updated without requiring a modification of the malware detection services 224 and/or verification applications executing on one or more client devices 206.

User configurations 248 may comprise, for example, settings defined by one or more users of one or more client devices 206. The user configurations 248 may be used in the determination of whether to permit the install and/or execution of an application 230 on a client device 206. For example, a user may define a user configuration 248 to override a determination that an application 230 comprises malware. In one embodiment, the user configuration 248 may define a time in which a check of an application 230 is conducted (e.g., at every installation, at every execution, every other execution, etc.).

Return codes 251 may comprise, for example, information that may be transmitted from the computing environment 203 to a client device 206 to identify whether an application 230 should be installed and/or executed on the client device 206. For example, a return code 251 may comprise a binary file wherein a "0" indicates that an application 230 should not be installed and/or executed and a "1" indicates that an application 230 may be installed and/or executed. The return code 251 may further comprise an indication of any events 254 that are to be executed in a client device 206, as may be appreciated.

Events 254 may comprise, for example, actions predefined by a manufacturer of a device 260, an operating system of the device 260, and/or a user of the device 260 to be conducted in the event malware is detected (or not detected). As a non-limiting example, an event 254 may comprise an automatic quarantine of the application 230. In an alternative embodiment, an event 254 may comprise an automatic deletion of the application 230.

Notifications 257 may comprise, for example, statements that may be predefined and transmitted to a client device 206 with a return code 251 to be displayed on the client device 206 and/or other presented to a user of the client device 206. For example, the client device 206 may display a message indicating that the application 230 attempting installation and/or execution comprises malware.

Devices 260 may comprise information associated with one or more client devices 206 including, but not limited to, a manufacture of the device, a make, a model, an operating system of the device, and/or any other information associated with the device 260.

Hash methodologies 263 may comprise, for example, procedures that may be employed in generating an application fingerprint 239 unique to an application 230. For example, a hash methodologies 263 may take data of any size and map the data to a much shorter bit string that has a high probability of being unique to the original data. Hash methodologies 263 may comprise, for example, a Secure Hash Algorithm (SHA), GOST, NAVAL, Message-Digest (e.g., MD2, MD4, MD5, etc.), PANAMA, RadioGatún, RACE Integrity Primitives Evaluation Message Digest (RIPEMD), Tiger, Tiger2, WHIRLPOOL, and/or any other hash methodology 263.

The client device 206 is representative of a plurality of client devices that may be coupled to the network 209. The client device 206 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability. The client device 206 may include a display 266. The display 266 may comprise, for example, one or more devices such as liquid crystal display (LCD) displays, gas plasma-based flat panel displays, organic light emitting diode (OLED) displays, LCD projectors, or other types of display devices, etc.

The client device 206 may be configured to execute various applications such as a client application 269 and/or other applications. The client application 269 may be executed in a client device 206, for example, to access network content served up by the computing environment 203 and/or other servers, thereby rendering a user interface 272 on the display 266. To this end, the client application 269 may comprise, for example, a browser, a dedicated application, etc., and the user interface 272 may comprise a network page, an application screen, etc. The client device 206 may be configured to execute applications beyond the client application 269 such as, for example, email applications, social networking applications, word processors, spreadsheets, and/or other applications.

Moreover, the client device 206 may comprise a client verification application 275 and/or one or more application fingerprints 239b that are stored locally on the client device in association with one or more application 230. The client verification application 275 may be executed to monitor installations and/or executions of applications 230 on the client device 206. The client verification application 275 may generate fingerprints 239 of an application 230 to compare to the application fingerprints 239b stored locally on the client device 206, as will be discussed in greater detail below.

Next, a general description of the operation of the various components of the networked environment 200 is provided. To begin, an application is received during an ingestion process. An ingestion process may comprise, for example, a series of user interfaces that may be presented to a user to facilitate an upload of an application 230 associated with the user to a data store 212. As a non-limiting example, the application 230 may be uploaded by a developer of the application 230 in order to make the application 230 available for consumption (e.g., sale, lease, download, etc.) in the electronic commerce system 215.

Next a thorough inspection of the application 230 may be conducted by the malware detection services 224, if the application 230 has not been previously inspected. For example, if the application 230 and/or an application fingerprint 239 of the application 230 are found in the data store 212, it would appear that the application 230 has previously been analyzed by the fingerprint service 221 and no further inspection may be warranted. Alternatively, if the application 230 and/or an application fingerprint 239 of the application 230 are not found in the data store 212, the application 230 received during the ingestion process may be stored in a data store 212 or like memory.

To inspect the application 230, the malware detection services 224 may "unpack" the application 230 to separate application code 242 from other content of the application 230 (e.g., assets, resources, certifications, libraries, manifest file(s), etc.).

The fingerprint services 221 may generate an application fingerprint 239 for the application 230. In one embodiment, the fingerprint is generated by applying one or more hash methodologies 263 to the application code 242 of the application 230. As may be appreciated, the application code 242 may be less substantial in data size than the entire application 230 itself. Moreover, the application code 242 is generally unique to an application 230. The application fingerprint 239 may be stored in data store 212 in association with the application 230 and/or the application code 242.

The malware detection services 224 may conduct a deep and thorough scan of an application 230 by comparing the application code 242 and/or portions of the application code 242 to the malware databases 245. In the event the application code 242 comprises malware, in box 630, the application 230 may be flagged as "malware" and/or stored as a denied application 236. In the event a user attempts to install and/or execute a denied application 236, the user may be denied and/or prompted with a warning, as will be discussed in greater detail below. In the event no malware is detected in the application code 242, the application 230 may be flagged as "clean" and/or stored as an approved application 233.

Accordingly, a request to install and/or execute an application 230 may be detected on the client device 206. As may be appreciated, a user may have previously purchased and/or downloaded an application 230 from the electronic commerce system 215. Upon a successful download, the application 230 an installation of the application 230 may be automatically initiated. Alternatively, a user of a client device 206 may attempt to directly install an application 230 on the client device 206 without downloading the application 230 from the electronic commerce system 215. For example, a user may transfer an application 230 to a client device 206 via Universal Serial Bus (USB) port on the client device 206. In either scenario, a request to install and/or execute the application 230 may be detected.

On the client device 206, the application code 242 of the application 230 may be checked against an application fingerprint 239 of the same application 230 if an application fingerprint 239 is stored locally. For example, if downloaded from the electronic commerce system 215, the electronic commerce system 215 may provide to the client device 206 an application fingerprint 239 of the application 230 downloaded to be stored locally on the client device 206. By comparing the application code 242 of the application 230 to the application fingerprint 239, it may be determined whether the application 230 has been modified, perhaps maliciously.

If the application code 242 of an application 230 matches an application fingerprint 239 of the application 230 stored locally on the device, the client device 206 may permit execution of the application 230. Alternatively, if there is no application fingerprint 239 stored locally and/or if the application code 242 and/or the fingerprint 239 do not match, application code 242 may be transmitted to computing environment 203 for further inspection. By transmitting the application code 242 of the application 230 to the computing environment 203, a rapid check of the application code 242 may be conducted and/or a thorough scan of the application code 242 may be conducted, as will be discussed in greater detail below. The client verification application 275 may await and/or receive a return code 251, or a similar response, from the computing environment 203.

The application code 242 may be compared to application codes 242 in the data store 212 to determine whether the application code 242 has been previously analyzed and/or inspected by the malware detection services. According to various embodiments, a comparison of an application fingerprint 239 to may employ, for example, "fuzzy" hashing to account for changes or variations in application code 230. Traditional hashing methods may require a 100% match to detect a match between two hashed data sets. Alternatively, "fuzzy" hashing may comprise comparing portions of hashed data to determine whether similarities are able to be identified between two hashed data sets. For example, if an application fingerprint 230 is 98% similar to a fingerprint stored in data store 212, a match may be identified. Thus, configurable predefined operational thresholds may be employed (e.g., +/−2% or any other range) to indicate a degree of similarity required for a match of application fingerprints 239 to be generated.

If the application code 242 has been previously stored in the data store 212, it is determined whether the application 230 has been approved or denied. This may be determined, for example, by determining whether an application 230 has been flagged and/or stored as an approved application 230 or a denied application 236. If the application is approved, a return code permitting the installation and/or execution of the application 230 may be transmitted from the computing environment 203 to the client device 206. If the application has been denied, a return code may be transmitted to the client device denying installation and/or execution of the application 230 on the client device.

If the application code 242 is not in a library or database of application codes 242, the application code 242 may be stored in data store 212 and a deep or thorough inspection of the application code 242 may be conducted by comparing the application code 242 and/or portions of the application code 242 to the malware database 245. As may be appreciated, the malware database 245 may contain information associated with various types of malware previously detected and may comprise fingerprints of malware or portions of malicious code which may be compared to fingerprints of application code 245 or portions of the application code 245. The malware database 245 may be employed in the determination of which applications 230 may comprise malware. According to various embodiments, a comparison of an application fingerprint 239 to known fingerprints of malware in a malware database 245 may employ, for example, "fuzzy" hashing to account for changes or variations that may be intentionally employed in "mutating" or polymorphic malware to fool detection of the malware. As discussed above, traditional hashing methods may require a 100% match to detect a match between two hashed data sets. Alternatively, "fuzzy" hashing may comprise comparing portions of hashed data to determine whether similarities are able to be identified between two hashed data sets. For example, if an application fingerprint 230 is 80% similar to a fingerprint of known malware stored in data store 212, a detection of malware may be identified. Thus, configurable predefined operational thresholds may be employed (e.g., +/−20% or any other range) to indicate a degree of similarity required for a detection of malware to be generated.

If malware is detected in the application code 242, the application 230 may be flagged and/or added to the denied applications 230 in data store 212 and one or more events 254 may be initiated. Events 254 may comprise, for example, actions predefined by an operator and/or moderator of the malware detection services 224 to be conducted in the event malware is detected. As a non-limiting example, an event 254 may comprise an automatic quarantine of the application 230. In an alternative embodiment, an event 254 may comprise an automatic deletion of the application 230.

Moreover, notifications 257 predefined by the operator and/or moderator of the malware detection services 224 may be transmitted to the client device 206 from the computing environment 203. Thus, the client device 206 may display the notification 257 to a user of the client device 206 indicating that the application 230 attempting installation and/or execution comprises malware. A return code 251 may be transmitted to the client device 206 denying installation and/or execution of the application 230 on the client device 206. The return code 251 may further comprise an indication of any events 254 that are to be executed in the client device 206, as may be appreciated.

In the event malware has not been detected in the application code 242, a return code 251 or a like response permitting installation and/or execution of the application 230 on the client device 206 may be transmitted to the client device 206. The application 230 may be added to the approved applications 233 in data store 212.

According to one embodiment, an application 230 may be received by the computing environment 203 from a client device 206 in response to an attempted installation and/or execution of the application 230 on the client device. An application 230 may be unpacked in the computing environment 203 to obtain the application code 242. The application code 242 may be hashed to generate a fingerprint that is unique to the application 230 that may be used for future identifications of the application 230 to determine whether the application 230 has been previously approved or disapproved. The fingerprint generated from the application code 242 may be stored in data store 212 in a library of application fingerprints 239a. Thus, when an installation of an application 230 is initiated on a client device 206, an approved application 230 will permit the client device 206 to proceed with the installation of the application 230 on the client device 206.

As may be appreciated, various versions of an application 230 may be deployed, made available on the electronic commerce system 215, or made available through other means. Similarly, various add-ons of an application 230 may modify the application 230 or malware may maliciously modify an application 230 or its application code 242. Thus, a hashing of the application code 242 will generate a fingerprint that will not be found in the library of application fingerprints 239. Accordingly, in the event a fingerprint of the application 230 is not identified in the library of the application fingerprints 239, the application 230 may be sent to malware detection services 224 to determine whether the application 230 comprises malware 230 or other malicious code. A response may be transmitted to the client device 206 permitting the installation and/or execution of the application 230.

According to an alternative embodiment, the fingerprint of an application 230 may be sent to a client device 206 to permit local comparisons of the application 230 to the fingerprint of the application 230 generated in the computing environment 203. In the event an application 230 is modified maliciously on the client device 206, a comparison of a fingerprint of the application 230 to the fingerprint generated in the computing environment 203 will identify that the application 230 has been altered.

Figure 3:
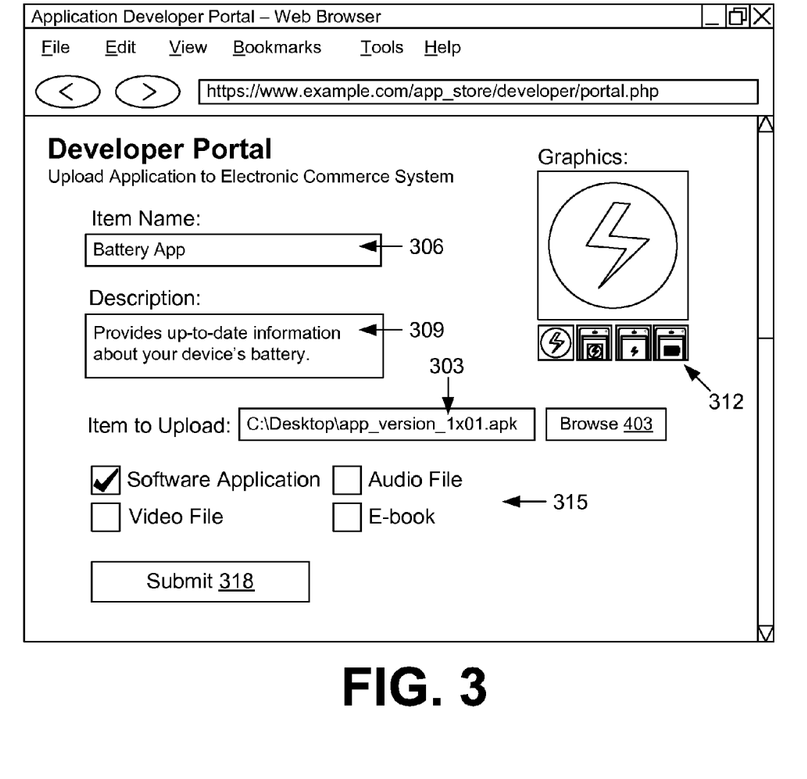
FIG. 3 is a drawing of an example of a user interface rendered by a client in the networked environment of FIG. 2 according to various embodiments of the present disclosure.

Referring next to FIG. 3, shown is an example user interface 272 (FIG. 2) that may be rendered by the developer portal 218 to facilitate the upload of one or more applications 230 (FIG. 2) and/or digital content items (e.g., audio files, video files, electronic books, etc.) to the electronic commerce system 215 (FIG. 2). In the non-limiting example of FIG. 3, shown is a "developer portal" that conducts an ingestion process, whereby a user (e.g., the developer of the application 230) provides the application 230 via an upload component 303 or other similar component. As may be appreciated, information associated with the application 230 may be requested during the ingestion process. Thus, the user may be prompted for an application name 306, an application description 309, application graphics 312, and/or a type of the item 315 being provided in the ingestion process. The user may complete submission of the application 230 or digital content item by engaging a submission component 318. As discussed above with respect to FIG. 2, an upload of the application 230 to data store 212 may initiate an inspection of the application 230 by the malware detection services 224.

Figure 4:
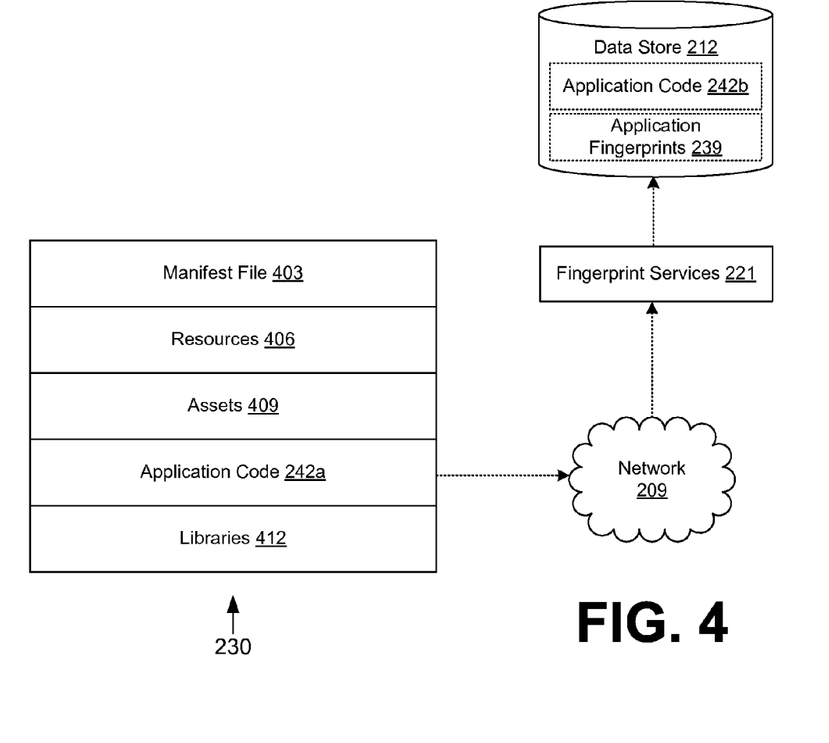
FIG. 4 is a drawing of components of an application file that may be transmitting over a computing environment in the networked environment of FIG. 2 according to various embodiments of the present disclosure.

Turning now to FIG. 4, shown is an example of the components of an application 230 that may be "unpacked" to identify the application code 242 of an application 230. For example, a single file of an application 230 may comprise a manifest file 403, resources 406, assets 409, application code 242a, and/or libraries 412 packaged into the single file of the application 230. The application code 242a may be identified and/or unpacked and transmitted over network 209 to the fingerprint services 221 which may be generate a unique fingerprint 239 of the application code 242a. The application code 242a may be stored in data store 212 as illustrated by application code 242b. Similarly, the application fingerprint 239 generated by the fingerprint services 221 may be stored in data store 212 as illustrated by application fingerprint 239b.

Figure 5:
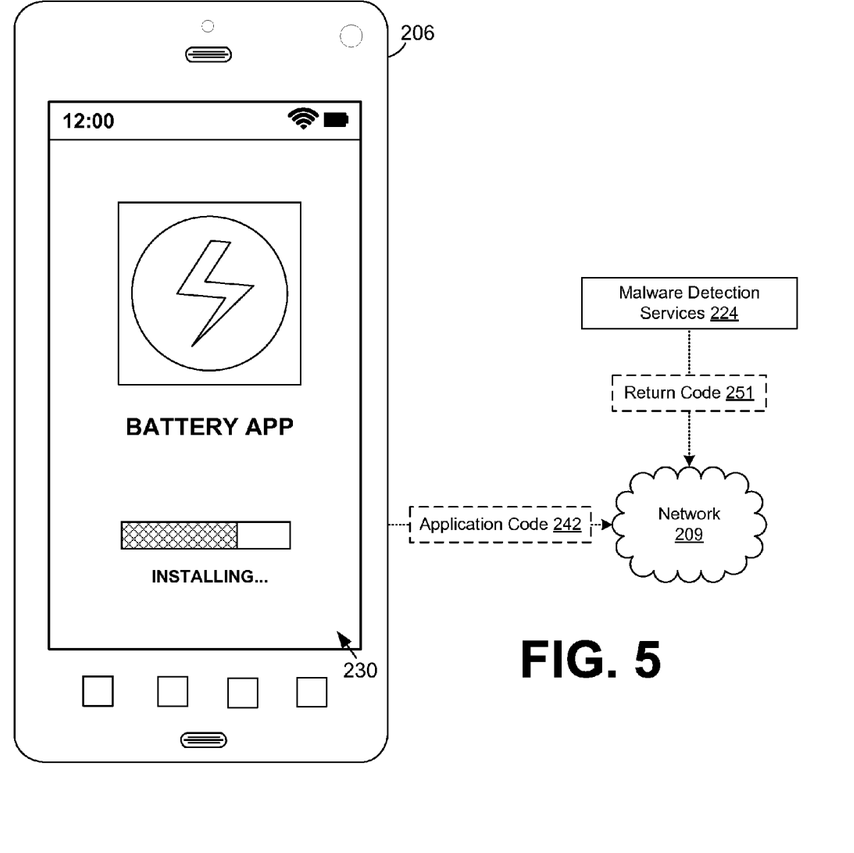
FIG. 5 is a drawing of a client device in communication with a computing environment in the networked environment of FIG. 2 according to various embodiments of the present disclosure.

FIG. 5 is a drawing of a client device in communication with a computing environment 203 in the networked environment of FIG. 2 according to various embodiments of the present disclosure. In the non-limiting example of FIG. 5, a client device 206 may comprise a mobile cellular telephone or a "smartphone." As shown in FIG. 5, an application 230 may be installed on the client device 206. Prior to and/or during the installation, the unpacked application code 242 of the application 230 may be transmitted over network 209 to the malware detection services 224. In response, the malware detection services 224 may transmit a return code 251 to the client device 206. The return code 251 may indicate whether to proceed with installation of the application 230 on the client device 206. In various embodiments, the return code 251 may indicate whether to permit execution of the application 230.

Figure 6:
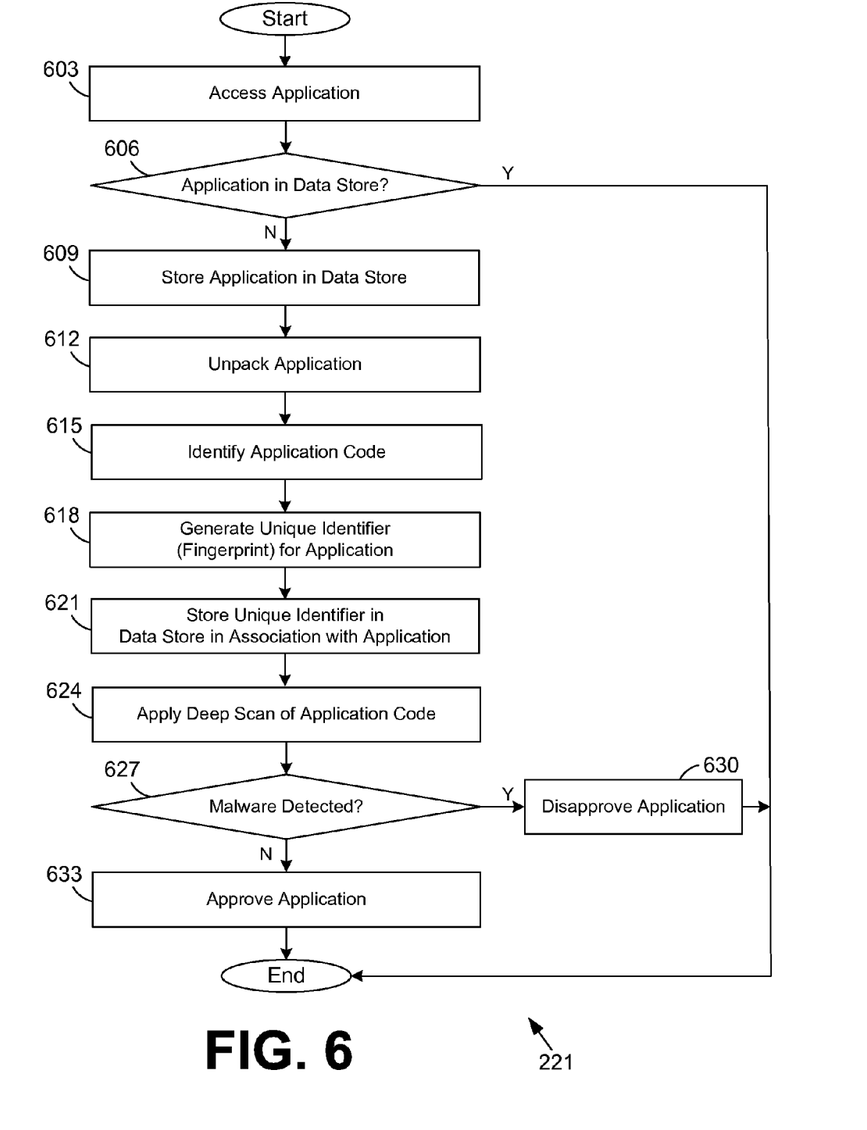
FIG. 6 is a flowchart illustrating one example of functionality implemented as portions of fingerprint services executed in a computing environment in the networked environment of FIG. 2 according to various embodiments of the present disclosure.

Referring next to FIG. 6, shown is a flowchart that provides one example of the operation of a portion of the fingerprint service 221 according to various embodiments. It is understood that the flowchart of FIG. 6 provides merely an example of the many different types of functional arrangements that may be employed to implement the operation of the portion of the fingerprint service 221 as described herein. As an alternative, the flowchart of FIG. 6 may be viewed as depicting an example of steps of a method implemented in the computing environment 203 (FIG. 2) according to one or more embodiments.

Beginning with box 603, an application 230 is accessed and/or received. In one embodiment, an application 230 may be received during an ingestion process comprising, for example, a series of user interfaces that may be presented to a user to facilitate an upload of an application 230 associated with the user to a data store 212. As a non-limiting example, the application 230 may be uploaded by a developer of the application 230 in order to make the application 230 available for consumption (e.g., sale, lease, download, etc.) on the electronic commerce system 215. In an alternative embodiment, the application 230 may be provided via one or more web services by making one or more programmatic service calls to the one or more web services. For example, a developer may upload multiple applications 230 by making API calls to the web services wherein the API calls comprise one or more application files. In a further embodiment, the application 230 may be received from a client device 206 upon an attempted execution or installation of the application 230. For example, a user may have downloaded and/or otherwise obtained an application 230 from a third-party other than the electronic commerce system 215. Upon an attempted installation or execution of the application 230 on a client device 206, the client device 206 may transmit and/or otherwise provide the application 230 (or the application code 242) to the computing environment 203. In yet another embodiment, a "crawler" or like component may search or "crawl" various network sites for files associated with one or more applications 230. Accordingly, the "crawler" may download the one or more applications 230 to data store 212. In an yet another embodiment, an Integrated Development Environment (IDE) used during the development of an application 230 may comprise, for example, a plug-in that may transmit the application 230 and/or the application code 242 to the computing environment 203 upon a request initiated in the IDE.

Next, in box 606, it is determined whether the application 230 and/or an application fingerprint 239 of the application 230 exists in the data store 212. If the application 230 and/or an application fingerprint 239 of the application 230 are found in the data store 212, it would appear that the application 230 has previously been analyzed by the fingerprint service 221 and no further analysis may be warranted. In box 609, if the application 230 and/or a fingerprint of the application 230 are not found in the data store 212, the application 230 received during the ingestion process may be stored in a data store 212 or like memory.

Next, in box 612, the application 230 may be "unpacked" to separate application code 242 from other content of the application 230 (e.g., assets, resources, certifications, libraries, manifest file(s), etc.). As a non-limiting example, an application 230 received may comprise an APK file. An APK file, corresponding to an application 230, may be a single packaged file comprising application code 242, assets, resources, certifications, libraries, manifest file(s), and/or any other information associated with an application 230. Thus, the application code 242 may be identified, in box 615, and separated from the other content of the application 230 for further inspection.

In box 618, a unique identifier, referred to as a "fingerprint," is generated for the application 230. In one embodiment, the fingerprint is generated by applying one or more hash methodologies 263 to the application code 242 of the application 230. As may be appreciated, the application code 242 of the application 230 may be less substantial in data size than the entire application 230 itself. Moreover, the application code 242 is generally unique to an application 230. In box 621, the application fingerprint 239 may be stored in data store 212 in association with the application 230 and/or the application code 242 of the application 230.

In box 624, a deep and thorough scan may be conducted by comparing the application code 242 and/or portions of the application code 242 to records in one or more malware databases 245. For example, the one or more malware databases 245 may comprise information and/or malware records associated with one or more computer viruses, Trojan horses, rootkits, key loggers, spyware, adware, and/or other malicious computer instructions. The application code 242, or portions thereof, may be compared to the malware records for identifiable characteristics, patterns, and/or portions of code that may indicate the presence of malware. For example, blocks of the application code 242 may be compared to blocks of known malware code. In another example, patterns of the application code 242 may be compared to known patterns of malicious applications (e.g., viruses, Trojan horses, etc.). It is understood that the scan conducted in box 624 may be conducted not only in response to the receipt of an application 230, but at predefined times and/or intervals. For example, as the malware database 245 is improved, new scans of applications 230 may be conducted periodically according to predefined durations.

In box 627, a determination is conducted to identify whether application code 242 and/or portions of the application code 242 comprise malware. In the event the application code 242 comprises malware, in box 630, the application 230 may be flagged as "malware" and/or stored as a disapproved application 230. Thus, in the event a user attempts to install and/or execute a disapproved application 230, the user may be denied and/or prompted with a warning, as will be discussed in greater detail below. In the event no malware was detected in the application code 242, in box 633, the application 230 may be flagged as "clean" and/or stored as an approved application 233.

Figure 7:
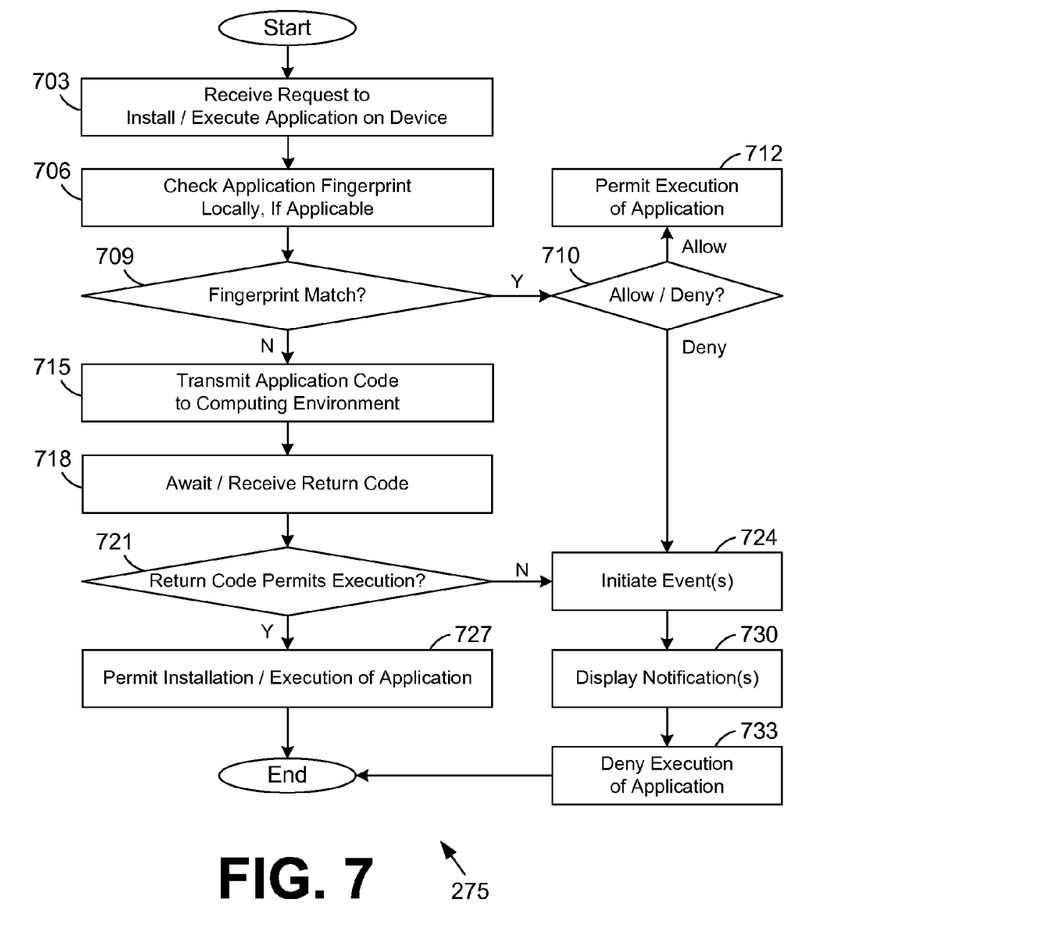
FIG. 7 is a flowchart illustrating one example of functionality implemented as portions of a client verification system executed in a computing environment in the networked environment of FIG. 2 according to various embodiments of the present disclosure.

Turning now to FIG. 7, shown is a flowchart that provides one example of the operation of a portion of the client verification application 275 according to various embodiments. It is understood that the flowchart of FIG. 7 provides merely an example of the many different types of functional arrangements that may be employed to implement the operation of the portion of the client verification application 275 as described herein. As an alternative, the flowchart of FIG. 7 may be viewed as depicting an example of steps of a method implemented in the client device 206 (FIG. 2) according to one or more embodiments.

Beginning with box 703, a request to install and/or execute an application 230 is received and/or conducted internal to the client device 206. As may be appreciated, a user may have previously purchased and/or downloaded an application 230 from the electronic commerce system 215. Upon a successful download, the application 230 an installation of the application 230 may be automatically initiated. Alternatively, a user of a client device 206 may attempt to directly install an application 230 on the client device 206 without downloading the application 230 from the electronic commerce system 215. For example, a user may transfer an application 230 to a client device 206 via Universal Serial Bus (USB) port on the client device 206. In either scenario, a request to install and/or execute the application 230 may be detected.

In box 706, the application code 242 may be checked against an application fingerprint 239 of the same application 230 if an application fingerprint 239 is stored locally. For example, if downloaded from the electronic commerce system 215, the electronic commerce system 215 may provide to the client device 206 an application fingerprint 239 of the application 230 downloaded to be stored locally on the client device 206. By comparing the application code 242 of the application 230 to the application fingerprint 239, it may be determined whether the application 230 has been modified, perhaps maliciously.

In box 709, it is determined whether application code 242 of an application 230 matches an application fingerprint 239 of the application 230 stored locally on the device. If so, in box 710, it may be determined whether the application 230 was previously approved and/or denied by the malware detection services 224. If approved, in box 712, the client device 206 may permit execution of the application 230. If denied, the execution and/or installation may be denied, as will be discussed in greater detail below. In the event no application fingerprint 239 was stored locally and/or if the application code 242 and/or the fingerprint do not match, in box 715, application code 242 may be transmitted to computing environment 203 for further inspection. By transmitting the application code 242 to the computing environment 203, a rapid check of the application code 242 may be conducted and/or a thorough scan of the application code 242 may be conducted, as will be discussed in greater detail below. In 718, the client verification application 275 may await and/or receive a return code 251, or a similar component, from the computing environment 203.

As may be appreciated, a return code 251, or similar component, may indicate to the client device 206 whether the application 230 should be installed and/or executed. Thus, in box 721, it is determined whether the return code 251 permits execution and/or installation of the application 230. If it does not, in box 724, one or more events 254 may be initiated. Events 254 may comprise, for example, actions predefined by a manufacturer of a device 260, an operating system of the device 260, and/or a user of the device 260 to be conducted in the event malware is detected. As a non-limiting example, an event 254 may comprise an automatic quarantine of the application 230. In an alternative embodiment, an event 254 may comprise an automatic deletion of the application 230.

In box 730, notifications 257 predefined in the client device 206 and/or transmitted to the client device 206 with the return code 251 may be displayed on the client device 206 and/or other presented to a user of the client device 206. For example, the client device 206 may display a message indicating that the application 230 attempting installation and/or execution comprises malware. As may be appreciated, the display of a notification 257 in box 730 may be optional.

In box 733, the installation and/or execution of the application 230 may be denied. In various embodiments, the user of the client device 206 may override the determination not to install and/or execute the application 230 perhaps after a notification 257 has been presented to the user warning the user of the risks inherent to installation and/or execution of the application 230.

If a return code permits installation and/or execution of an application, in box 727, the application 230 may be installed and/or executed. The client device 206 may store a variable indicating that the application 230 has been checked for malware in order for the check to not occur at every execution.

Figure 8:
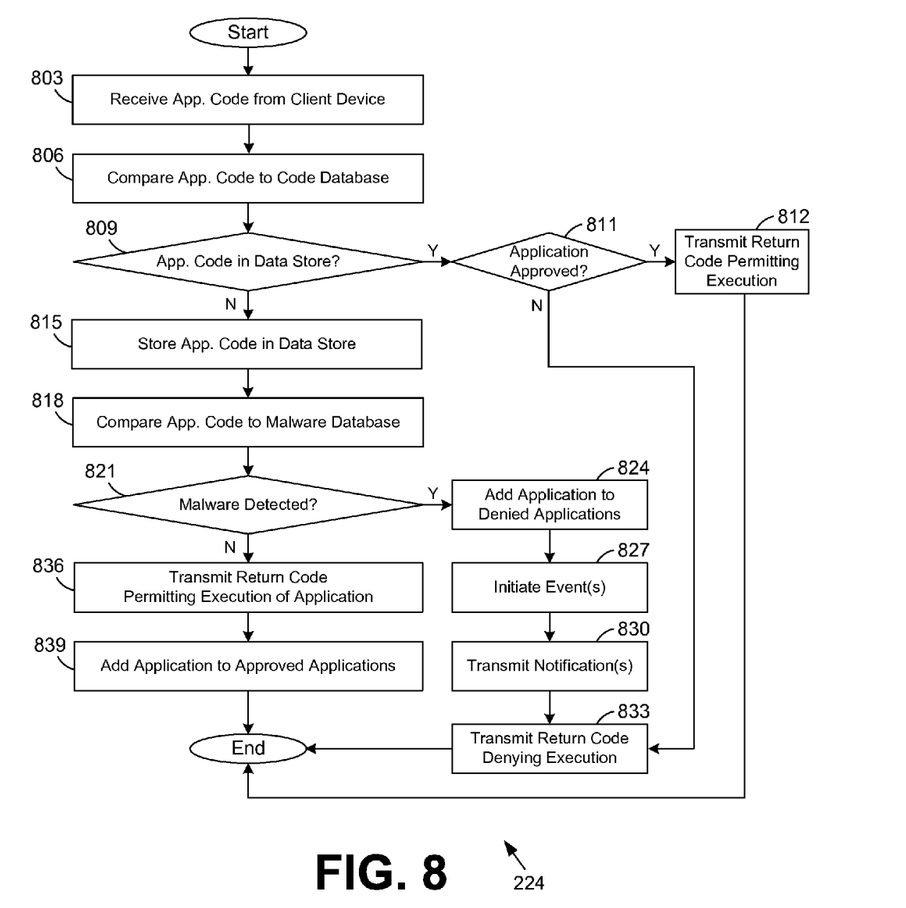
FIG. 8 is a flowchart illustrating one example of functionality implemented as portions of malware detection services executed in a computing environment in the networked environment of FIG. 2 according to various embodiments of the present disclosure.

Referring next to FIG. 8, shown is a flowchart that provides one example of the operation of a portion of the malware detection services 224 according to various embodiments. It is understood that the flowchart of FIG. 8 provides merely an example of the many different types of functional arrangements that may be employed to implement the operation of the portion of the malware detection services 224 as described herein. As an alternative, the flowchart of FIG. 8 may be viewed as depicting an example of steps of a method implemented in the computing environment 203 (FIG. 2) according to one or more embodiments.

As discussed above with respect to FIG. 7, a client device 206 (FIG. 2), upon installation and/or execution of an application 230 on the client device 206, may transmit application code 242 to the malware detection services 224. Beginning with box 803, the application code 242 of the application 230 is received by the malware detection services 224 from the client device 206. In box 806, the application code 242 may be compared to application codes 242 in the data store 212 to determine whether the application code 242 has been previously analyzed and/or inspected by the malware detection services (box 809). If the application code 242 has been previously stored in the data store 212, in box 811, it is determined whether the application 230 has been approved or denied. This may be determined, for example, by determining whether an application 230 has been flagged and/or stored as an approved application 233 or a denied application 236. If the application is approved, a return code 251 permitting installation and/or execution of the application 230 may be transmitted from the computing environment 203 to the client device 206. If the application has been denied, a return code may be transmitted to the client device denying installation and/or execution of the application 230 on the client device 206 (box 812).

If the application code 242 is not in a library or database of application codes 242, in box 815, the application code 242 may be stored in data store 212 or similar memory. In box 818, a "deep" or thorough inspection of the application code 242 may be conducted by comparing the application code 242 and/or portions of the application code 242 to the malware database 245. As may be appreciated, the malware database 245 may contain information associated with various types of malware previously detected. The malware database 245 may be employed in the determination of which applications 230 may comprise malware. For example, the one or more malware databases 245 may comprise information and/or malware records associated with one or more computer viruses, Trojan horses, rootkits, key loggers, spyware, adware, and/or other malicious computer instructions. The application code 242, or portions thereof, may be compared to the malware records for identifiable characteristics, patterns, and/or portions of code that may indicate the presence of malware. For example, blocks of the application code 242 may be compared to blocks of known malware code. In another example, patterns of the application code 242 may be compared to known patterns of malicious applications (e.g., viruses, Trojan horses, etc.).

In box 821, it is determined whether malware has been detected in the application code 242. If malware has been detected in the application code 242, in box 824, the application 230 may be flagged and/or added to the denied applications 236 in data store 212. In box 827, one or more events 254 may be initiated. Events 254 may comprise, for example, actions predefined by an operator and/or moderator of the malware detection services 224 to be conducted in the event malware is detected. As a non-limiting example, an event 254 may comprise an automatic quarantine of the application 230. In an alternative embodiment, an event 254 may comprise an automatic deletion of the application 230.

In box 830, notifications 257 predefined by the operator and/or moderator of the malware detection services 224 may be transmitted to the client device 206. Thus, the client device 206 may display the notification 257 to a user of the client device 206 indicating that the application 230 attempting installation and/or execution comprises malware. A return code 251 may be transmitted, in box 833, to the client device 206 denying installation and/or execution of the application 230 on the client device 206. The return code 251 may further comprise an indication of any events 254 that are to be executed in the client device 206, as may be appreciated.

In the event malware has not been detected in the application code 242, a return code 251 permitting installation and/or execution of the application 230 on the client device 206 may be transmitted to the client device 206, in box 836. In box 839, the application 230 may be added to the approved applications 233 in data store 212.

Although described above with respect to an application 230 and/or application code 242, the malware detection services 224 may be configured to inspect other file types such as word processing documents, images, spreadsheets, network pages (e.g., HTML documents accessed over a network), audio files, video files, scripts, and/or any other file type. As may be appreciated, the files may be treated as the packaged application file described above and unpackaged to obtain code instructing a machine to perform an instruction. The code may be inspected by the malware detection services 224 as described above.

Figure 9:
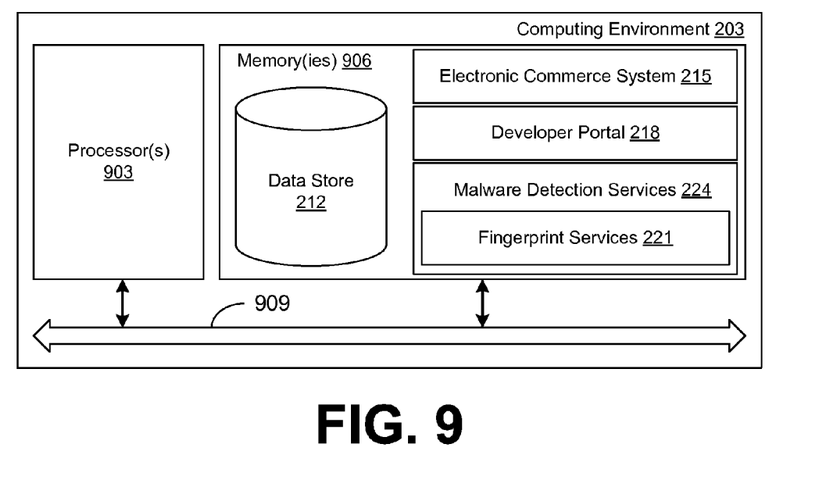
FIG. 9 is a schematic block diagram that provides one example illustration of a computing environment employed in the networked environment of FIG. 2 according to various embodiments of the present disclosure.

With reference to FIG. 9, shown is a schematic block diagram of the computing environment 203 according to an embodiment of the present disclosure. The computing environment 203 includes one or more computing devices, wherein each computing device includes at least one processor circuit, for example, having a processor 903 and a memory 906, both of which are coupled to a local interface 909. To this end, each computing environment 203 may comprise, for example, at least one server computer or like device. The local interface 909 may comprise, for example, a data bus with an accompanying address/control bus or other bus structure as can be appreciated.

Stored in the memory 906 are both data and several components that are executable by the processor 903. In particular, stored in the memory 906 and executable by the processor 903 are the electronic commerce system 215, the developer portal 218, the fingerprint service 221, the malware detection services 224, and potentially other applications. Also stored in the memory 906 may be a data store 212 and other data. In addition, an operating system may be stored in the memory 906 and executable by the processor 903.

It is understood that there may be other applications that are stored in the memory 906 and are executable by the processor 903 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 906 and are executable by the processor 903. In this respect, the term "executable" means a program file that is in a form that can ultimately be run by the processor 903. Examples of executable programs may be, for example, a compiled program that can be translated into machine code in a format that can be loaded into a random access portion of the memory 906 and run by the processor 903, source code that may be expressed in proper format such as object code that is capable of being loaded into a random access portion of the memory 906 and executed by the processor 903, or source code that may be interpreted by another executable program to generate instructions in a random access portion of the memory 906 to be executed by the processor 903, etc. An executable program may be stored in any portion or component of the memory 906 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 906 is defined herein as including both volatile and nonvolatile memory and data storage components. Volatile components are those that do not retain data values upon loss of power. Nonvolatile components are those that retain data upon a loss of power. Thus, the memory 906 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 903 may represent multiple processors 903 and/or multiple processor cores and the memory 906 may represent multiple memories 906 that operate in parallel processing circuits, respectively. In such a case, the local interface 909 may be an appropriate network that facilitates communication between any two of the multiple processors 903, between any processor 903 and any of the memories 906, or between any two of the memories 906, etc. The local interface 909 may comprise additional systems designed to coordinate this communication, including, for example, performing load balancing. The processor 903 may be of electrical or of some other available construction.

Although the electronic commerce system 215, the developer portal 218, the fingerprint service 221, the malware detection services 224, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 6, 7, and 8 show the functionality and operation of an implementation of portions of the electronic commerce system 215, the developer portal 218, the fingerprint service 221, and/or the malware detection services 224. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 903 in a computer system or other system. The machine code may be converted from the source code, etc. If embodied in hardware, each block may represent a circuit or a number of interconnected circuits to implement the specified logical function(s).

Although the flowcharts of FIGS. 6, 7, and 8 show a specific order of execution, it is understood that the order of execution may differ from that which is depicted. For example, the order of execution of two or more blocks may be scrambled relative to the order shown. Also, two or more blocks shown in succession in FIGS. 6, 7, and 8 may be executed concurrently or with partial concurrence. Further, in some embodiments, one or more of the blocks shown in FIGS. 6, 7, and 8 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the electronic commerce system 215, the developer portal 218, the fingerprint service 221, the malware detection services 224, the client application 269, and/or the client verification application 275, that comprises software or code can be embodied in any non-transitory computer-readable medium for use by or in connection with an instruction execution system such as, for example, a processor 903 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program executable in at least one computing device, the program comprising program code that, when executed, causes the at least one computing device to:
   access an application received from a client device remotely over a network, wherein the application is communicated by the client device to the at least one computing device in response to an attempted installation of the application on the client device, the application comprising a package file;
   unpacking the package file of the application to identify source code of the application;
   generate a fingerprint of the source code by segmenting the source code into at least two segments and hashing each of the at least two segments;
   determine whether the application has been previously inspected for malware by comparing the fingerprint of the source code to a plurality of fingerprint records in a fingerprint database to determine whether a matching one of the plurality of fingerprint records exists in the fingerprint database that has a degree of similarity to the fingerprint that meets a predefined threshold;
   in response to the application not having been previously inspected for malware, determine whether the application comprises malware by comparing the source code to a plurality of records in a malware database; and
   in response to the application not comprising malware, causing a response to be communicated to the client device over the network that causes the client device to permit an installation of the application on the client device.

2. The non-transitory computer-readable medium of claim 1, wherein hashing the at least two segments is performed using a hashing methodology selected from a group consisting of: a fuzzy hash, a secure hash algorithm (SHA), a GOST hash, a HAVAL hash, a message-digest (MD) hash, a PANAMA hash, a RadioGatún hash, a Tiger hash, a Tiger2 hash, and a WHIRLPOOL hash.

3. The non-transitory computer-readable medium of claim 1, wherein the program further comprises program code that, when executed, causes the at least one computing device to perform a quarantine of the application or a removal of the application on the client device in response to the application comprising malware.

4. A system, comprising:
   at least one remote computing device in communication with a client device over a network; and
   a malware detection service executable in the at least one remote computing device, the malware detection service comprising logic that causes the at least one remote computing device to:
   access a source code of an application received from the client device over the network in response to an attempted installation of the application on the client device;
   unpacking the application to parse source code from an application package file;
   determine whether the source code exists in a source code database indicating that the source code of the application has been previously inspected for malware;
   generate a fingerprint of the source code by identifying at least two portions of the source code and hashing the at least two portions;
   in response to the source code not existing in the source code database, determine whether the application comprises malware by comparing the fingerprint of the source code to a plurality of records in a malware database, and by determining whether the fingerprint has a degree of similarity to a respective record in the malware database that meets a predefined threshold; and
   generate a response to be communicated to the client device over the network, the response indicating whether an installation is permitted on the client device.

5. The system of claim 4, wherein the logic that causes the at least one remote computing device to determine whether the source code exists in the source code database further comprises logic that causes the at least one remote computing device to determine whether the source code has a degree of similarity to a respective source code in the source code database, the degree of similarity meeting a predefined threshold.

6. The system of claim 4, wherein the application is communicated to the at least one remote computing device from the client device in response to an attempted execution of the application on the client device.

7. The system of claim 4, wherein the malware detection service further comprises logic that periodically determines whether the application comprises malware by comparing the fingerprint of the source code to the plurality of records in the malware database.

8. The system of claim 4, wherein the logic that causes the at least one remote computing device to determine whether the source code exists in the source code database further comprises logic that:
- performs a hash of the source code to generate the fingerprint of the source code, wherein the fingerprint is a unique identifier of the source code; and
- compares the fingerprint of the source code to a plurality of fingerprint records in a fingerprint database to determine whether the fingerprint of the source code exists in the fingerprint database.

9. The system of claim 4, wherein the malware detection service further comprises logic that causes the at least one remote computing device to add the application to an approved application database in response to the determination being made that the source code of the application does not comprise malware.

10. The system of claim 4, wherein the malware detection service further comprises logic that causes the at least one remote computing device to add the application to a denied application database in response to the determination being made that the source code of the application comprises malware.

11. The system of claim 4, wherein the malware detection service further comprises logic that causes the at least one remote computing device to perform a predefined event in response to the determination that the application comprises malware.

12. The system of claim 4, wherein the malware detection service further comprises logic that causes the at least one remote computing device to generate a notification associated with the response for communication to the client device.

13. The system of claim 4, wherein the malware detection service further comprises logic that overrides an indication to deny the application from executing or installing on the client device based at least in part on a predefined user configuration.

14. The system of claim 4, wherein the malware detection service further comprises logic that performs a quarantine of the application or a removal of the application on the client device in response to the application comprising malware.

15. The system of claim 4, wherein the attempted installation is identified from a transfer of the application to the client device through a universal serial bus (USB) port of the client device.

16. A computer-implemented method, comprising:
- identifying, by a client device, an attempted installation of an application on the client device;
- generating, by the client device, a fingerprint from source code unpacked from the application, the fingerprint being generated by identifying and hashing at least two portions of the source code;
- comparing, by the client device, the fingerprint of the source code a plurality of fingerprint records stored locally on the client device to determine whether the fingerprint of the source code has a degree of similarity to a respective one of the plurality of fingerprint records that meets a predefined threshold;
- responsive to the degree of similarity not meeting the predefined threshold, sending, by the client device, the source code of the application to at least one remote computing device for inspection;
- receiving, by the client device, a response from the at least one remote computing device indicating whether the application comprises malware; and
- responsive to the response indicating that the application does not comprise malware, initiating, by the client device, an installation of the application on the client device.

17. The computer-implemented method of claim 16, further comprising initiating, by the client device, an execution of the application on the client device responsive to the response indicating that the application does not comprise malware.

18. The computer-implemented method of claim 16, further comprising initiating, by the client device, a quarantine of the application on the client device responsive to the response indicating that the application comprises malware.

19. The computer-implemented method of claim 16, further comprising initiating, by the client device, a removal of the application from a memory of the client device responsive to the response indicating that the application comprises malware.

20. The computer-implemented method of claim 16, further comprising overriding, by the client device, an indication of the response to perform an action on the client device based at least in part on a predefined user configuration.

* * * * *